US006926403B2

United States Patent
Yi et al.

(10) Patent No.: US 6,926,403 B2
(45) Date of Patent: Aug. 9, 2005

(54) HALF-JACKET EYEWEAR WITH REMOVABLE DUST SHIELD

(75) Inventors: Kennon Yi, Glendale, CA (US); Kyung Hwan Min, Seoul (KR)

(73) Assignee: KBC America, Inc., Burbank, CA (US)

( * ) Notice: Subject to any disclaimer, the term of this patent is extended or adjusted under 35 U.S.C. 154(b) by 0 days.

(21) Appl. No.: 10/882,392

(22) Filed: Jul. 2, 2004

(65) Prior Publication Data

US 2005/0024582 A1 Feb. 3, 2005

Related U.S. Application Data

(63) Continuation-in-part of application No. 10/608,123, filed on Jun. 30, 2003, which is a continuation-in-part of application No. 09/992,361, filed on Nov. 19, 2001, now Pat. No. 6,793,336.

(30) Foreign Application Priority Data

Jul. 26, 2001 (KR) .......................................... 2001-22673

(51) Int. Cl.[7] .............................. G02C 11/08; G02C 1/08
(52) U.S. Cl. .............................. 351/62; 351/41; 351/86; 351/123; 351/154
(58) Field of Search .............................. 351/41, 44, 62, 351/83–89, 103, 109, 123, 154; 2/426, 429, 431, 432

(56) References Cited

U.S. PATENT DOCUMENTS

| 5,300,963 A | * | 4/1994 | Tanaka | ........................ 351/44 |
| 6,224,209 B1 | * | 5/2001 | Chen | ............................ 351/86 |
| 6,491,388 B1 | * | 12/2002 | Chen | ............................ 351/86 |

* cited by examiner

*Primary Examiner*—Huy Mai
(74) *Attorney, Agent, or Firm*—Miles & Stockbridge, P.C.; Edward J. Kondracki (57) ABSTRACT

Eyewear includes a half-jacket frame. A removable shield, extending from the half-jacket frame to the wearer's face, may be provided to prevent direct impingement of air and dust on the wearer's eyes. The half-jacket frame includes a left indent, a left upper lens groove adapted to receive a left lens, a right indent, and a right upper lens groove adapted to receive a right lens. The removable shield includes a left lens opening, a left detent adapted to cooperatively receive the left indent of the half-jacket frame, a left lower lens groove adapted to receive the left lens and mate circumferentially with the half-jacket frame, a right lens opening, a right detent adapted to cooperatively receive the right indent of the half-jacket frame, and a right lower lens groove, adapted to receive the right lens and mate circumferentially with the half-jacket frame. The half-jacket frame may be constructed of titanium.

23 Claims, 9 Drawing Sheets

HALF-JACKET EYEWEAR WITH REMOVABLE DUST SHIELD

CLAIM FOR PRIORITY/CROSS-REFERENCE TO RELATED APPLICATIONS

This application is a Continuation-In-Part of U.S. patent application Ser. No. 10/608,123, filed Jun. 30, 2003, which is a Continuation-In-Part of U.S. Patent application Ser. No. 09/992,361, filed Nov. 19, 2001 now U.S. Pat. No. 6,793,336, which claims priority to Korean Patent Application Serial No. 2001-22673, filed Jul. 26, 2001, all of which are incorporated by reference herein.

TECHNICAL FIELD

The subject application relates to eyewear, and more particularly to eyewear worn in conjunction with high speed sports such as motorcycle or bicycle riding.

BACKGROUND OF THE INVENTION

Eyewear typically has a frame for holding lenses in place. A frame that extends only part of the way around a lens is known as a half-jacket frame. The inventors herein have identified various considerations in the design of half-jacket and other eyewear.

For example, when a person wears half-jacket eyewear, there may be more space around the lens than with full jacket eyewear, permitting dust or wind to impinge upon the wearer's eye, especially when the wearer is a participant in high speed sports such as motorcycle riding.

As another example, when eyewear is provided with a detachable shield, a suitable attachment means is needed. The eyewear needs to be functional and aesthetic both with and without the shield.

As a still further example, half-jacket frames lack fully circumferential orbitals around the lenses and may have less strength or dimensional stability than similar full-jacket frames. Such half-jacket frames may thus require special design considerations.

SUMMARY OF THE INVENTION

Embodiments of the present invention are directed to eyewear that includes a half-jacket frame. A removable shield, extending from the half-jacket frame to the wearer's face, may be provided to prevent direct impingement of air and dust on the wearer's eyes. The half-jacket frame includes a left indent, a left upper lens groove adapted to receive a left lens, a right indent, and a right upper lens groove adapted to receive a right lens. The removable shield includes a left lens opening, a left detent adapted to cooperatively receive the left indent of the half-jacket frame, a left lower lens groove adapted to receive the left lens and mate circumferentially with the half-jacket frame, a right lens opening, a right detent adapted to cooperatively receive the right indent of the half-jacket frame, and a right lower lens groove, adapted to receive the right lens and mate circumferentially with the half-jacket frame. The half-jacket frame may be constructed of titanium.

DETAILED DESCRIPTION

Figure 1:
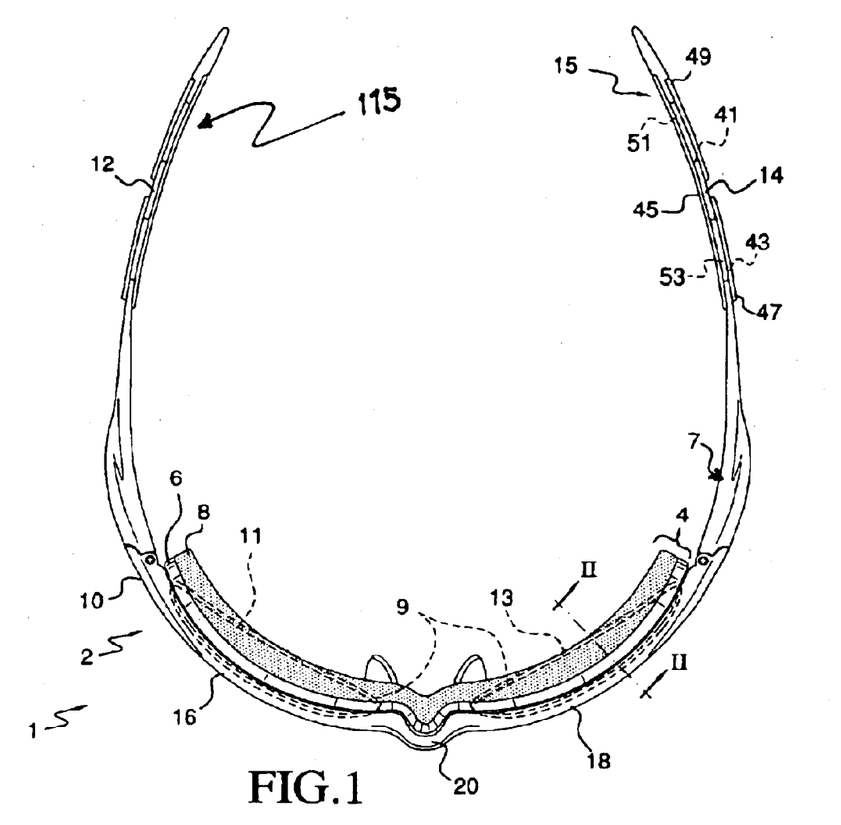
FIG. 1 shows a top view of an embodiment of eyewear 1.

FIG. 1 shows a top view of an embodiment of eyewear 1. Eyewear 1 according to the inventive concept includes half-jacket goggles 2 which may include a titanium frame. Rearwardly disposed inner frame, or shield 4, may be provided which, advantageously, is removable from goggles 2.

Goggles 2 include frame 7, which may be constructed of titanium, titanium alloy, or like material, having frame front 10, left temple 12 and right temple 14. Frame front 10 includes left orbital 16, right orbital 18, and connecting nose bridge 20. Goggles 2 also include lenses 9, including left lens 11 and right lens 13 disposed in left orbital 16 and right orbital 18, respectively. Left lens 11 and right lens 13 may be clear or tinted and can advantageously be separately removable from frame 7, for convenient replacement with a lens of choice. Right temple 14 may include removable slip resistor 15, while left temple 12 may include slip resistor 115.

In an embodiment, slip resistor 15 is disposed in holes 41 and 43, formed in temple 14, and includes backing 45, pad 47, and pad 49. Backing 45 is connected to pad 47 by extension 51 disposed in hole 41. Backing 45 is also connected to pad 49, by extension 53 disposed in hole 43. Backing 45, pad 47, pad 49, extension 51, and extension 53 may be formed in one piece of elastomeric material selected to resist slipping. Slip resistor 15 may be inserted into temple 14 by deforming pad 49 to fit through hole 41, and deforming pad 47 to fit through hole 43. Thus, slip resistor 15 may be press-fit into temple 14 from the side facing a wearer of eyewear 1. Similarly, slip resistor 115 also includes a backing facing the wearer and pads facing away from the wearer. The backings are configured to contact the skin of a wearer's head, and the pads are configured to contact the skin of a wearer's ears, in order to advantageously reduce slippage.

Shield 4 includes plastic segment 6 to which is attached pad 8. Plastic segment 6 has a bent face that contacts an inner surface, or back face, of frame front 10, while pad 8 extends from the back surface of plastic segment 6 to provide a seal between frame 10 and the wearer's face in order to protect the wearer's eyes from wind and dirt that might otherwise pass frame 10. Pad 8 may be a soft pliable material, such as, for example, air-permeable foam, that allows pad 8 to conform to the shape of the wearer's face. Shield 4 preferably has a substantially uniform thickness less than one half inch, and, in one embodiment, pad 8 may have a thickness 't' that is about one-quarter (0.25) inch. Pad 8 is attached to the full inner surface, or back face, of frame front 10 by a suitable adhesive, and conforms to the curvature of plastic segment 6, which, in turn, conforms to the curvature of frame front 10.

Figure 2:
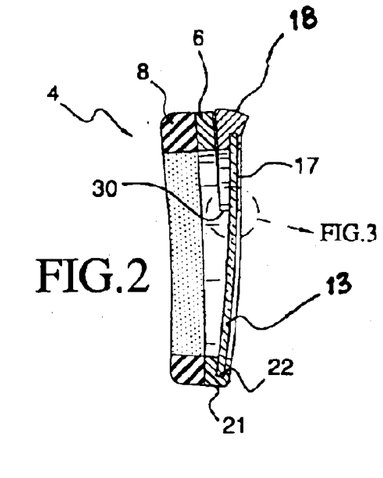
FIG. 2 depicts a cross section of eyewear 1 viewed through right orbital 18 at lines II—II in FIG. 1.
Figure 4:
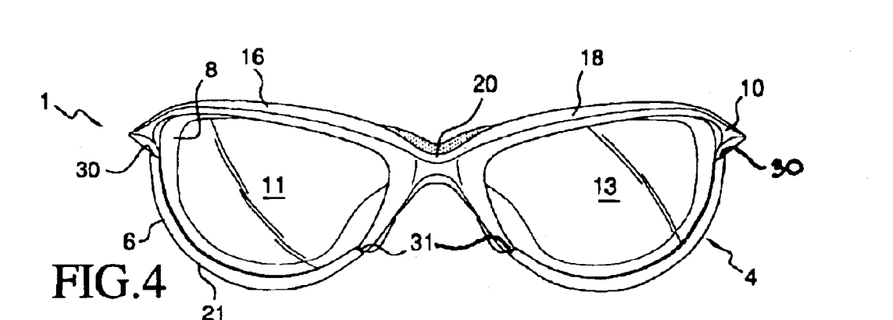
FIG. 4 illustrates a front view of eyewear 1 shown in FIG. 1.

FIG. 2 depicts a cross section of eyewear 1 viewed through right orbital 18 at lines II—II in FIG. 1. Right orbital 18 contains groove 17 dimensioned to cooperatively receive right lens 13. Plastic segment 6 of shield 4 includes shield extension 21, as shown in FIG. 4. Shield extension 21 is part of shield 4 and extends in front of right lens 13. Shield extension 21 has a U-shaped channel 22 cooperatively dimensioned to receive right lens 13. Groove 17 and U-shaped channel 22 may be of similar dimensions. The shield extension 21 and the frame front 10 are aligned such that groove 17 and U-shaped channel 22 abut each other at notch 30 and terminus 31 to advantageously form a circumferentially complete lens groove for receiving right lens 13.

Figure 3:
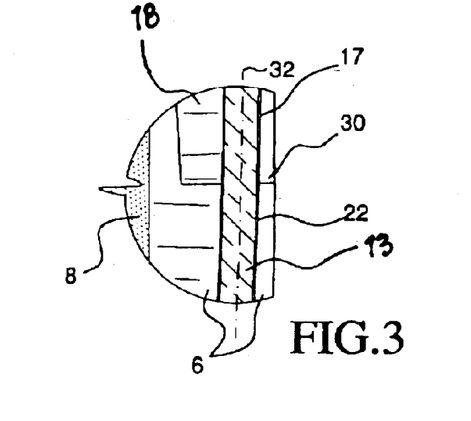
FIG. 3 presents an enlarged detail drawing of the circled portion of FIG. 2.

FIG. 3 presents an enlarged detail drawing of the circled portion of FIG. 2. Groove 17 is shown meeting channel 22 where plastic segment 6 abuts right orbital 18 at notch 30. Groove 17 and channel 22 may have a common center line 32 and may each have a width approximately equal to the thickness of right lens 13. In one embodiment, groove 17, channel 22, and right lens 13 each measure about 2.3 millimeters from front to back.

FIG. 4 illustrates a front view of eyewear 1 shown in FIG. 1. Shield extension 21 is shown meeting up with right orbital 18 at both notch 30 and terminus 31. Together, shield extension 21 and right orbital 18 completely surround right lens 13, with shield extension 21 surrounding the portion of right lens 13 that is below notch 30 and terminus 31, and right orbital 18 surrounding the remaining portion of right lens 13. Thus, shield extension 21 and its U-shaped channel 22 meet up with right orbital 18 and its groove 17 to advantageously and continuously surround right lens 13. Left orbital 16 may be part of a similar arrangement for left lens 11.

Viewed from the front of eyewear 1, shield extension 21 may visually continue the outlines of frame front 10. To the casual observer, shield extension 21 may visually convert eyewear 1 from a half-jacket arrangement to an apparent full-jacket arrangement. Since shield 4 is removable from frame front 10, this arrangement advantageously provides eyewear that is convertible back and forth between a half-jacket appearance and a full-jacket appearance.

Figure 5:
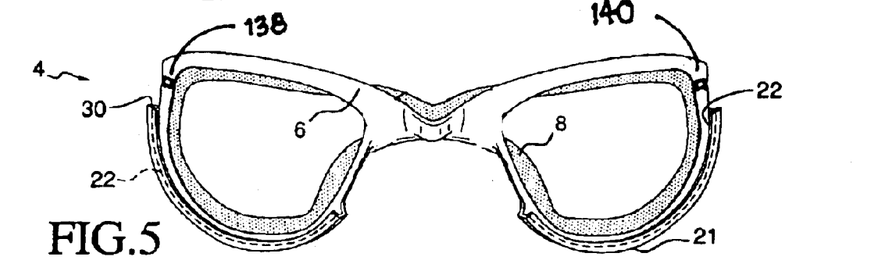
FIG. 5 shows a front view of shield 4 after removal from goggles 2.

FIG. 5 shows a front view of shield 4 after removal from goggles 2. Shield 4 may be releasably secured to goggles 2 by a wide variety of means. In one embodiment, left detent 138 and right detent 140 cooperate with frame front 10 to releasably secure shield 4 to goggles 2. For example, with reference to FIGS. 14A and 14B, left indent 156 and right indent 158 are molded into, or cut out of, left orbital 16 and right orbital 18, respectively, and are dimensioned to mate with left detent 136 and right detent 140, respectively, as shown in FIG. 5. Preferably, the dimensions of left indent 156 and right indent 158 are tightly controlled to form a snap fit with left detent 138 and right detent 140, respectively. In another embodiment, channel 22 of shield extension 21 may releasably contact the lower portions of left lens 11 and right lens 13. This contact may be maintained by various means, including, for example, a friction fit, a press fit, etc.

In a further embodiment, left detent 138, right detent 140 and channel 22 may be used in cooperation to releasably secure shield 4 to goggles 2. Various methods may be employed to remove and attach shield 4 to goggles 2. For example, the wearer may grasp goggles 2 in one hand and the center portion of shield 4 in the other, press the center portion of shield 4 against nose bridge 20, snap left detent 138 and right detent 140 into left indent 156 and right indent 158, respectively, and then fit shield extension 21 around the lower portions of left lens 11 and right lens 13. Removal of shield 4 from goggles 2 may be accomplished, for example, by grasping goggles 2 in one hand, the center portion of shield 4 in the other and gently pulling these components apart, applying a small torque if necessary. Other methods of removal and attachment are obviously contemplated.

Figure 6:
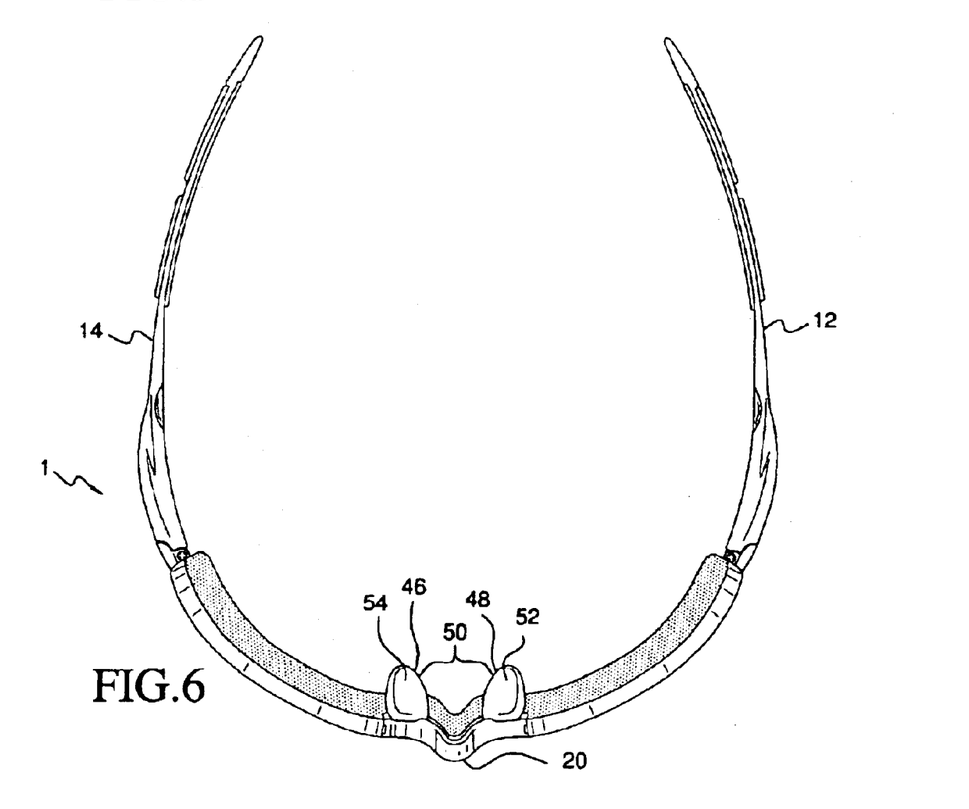
FIG. 6 presents a bottom-up view of eyewear 1.

FIG. 6 presents a bottom-up view of eyewear 1. In an embodiment, nose bridge 20 includes nosepads 50 having left nosepad 48 and right nosepad 46. Nosepads 50 may be molded of one piece with nose bridge 20, or separately supported thereby. Nosepads 50 are dimensioned and designed to contact the nose of a person wearing eyewear 1. Left nosepad 48 and right nosepad 46 are sheathed in nosepad covers 52 and 54, respectively. Nosepad covers 52 and 54 may be formed of elastomeric material and may be removable from nosepads 50. For example, nosepad covers 52 and 54 may be removable and may be constructed from an elastic material, such as, for example, elastic rubber. In this embodiment, nosepad covers 52 and 54 stretch over nosepads 50 and thereby be releasably secured thereto. In an alternative embodiment, nosepad covers 52 and 54 are permanently affixed to nosepads 50, using, for example, a water-resistant adhesive. Preferably, nosepad covers 52 and 54 may be formed from anti-slip rubber.

Figure 7:
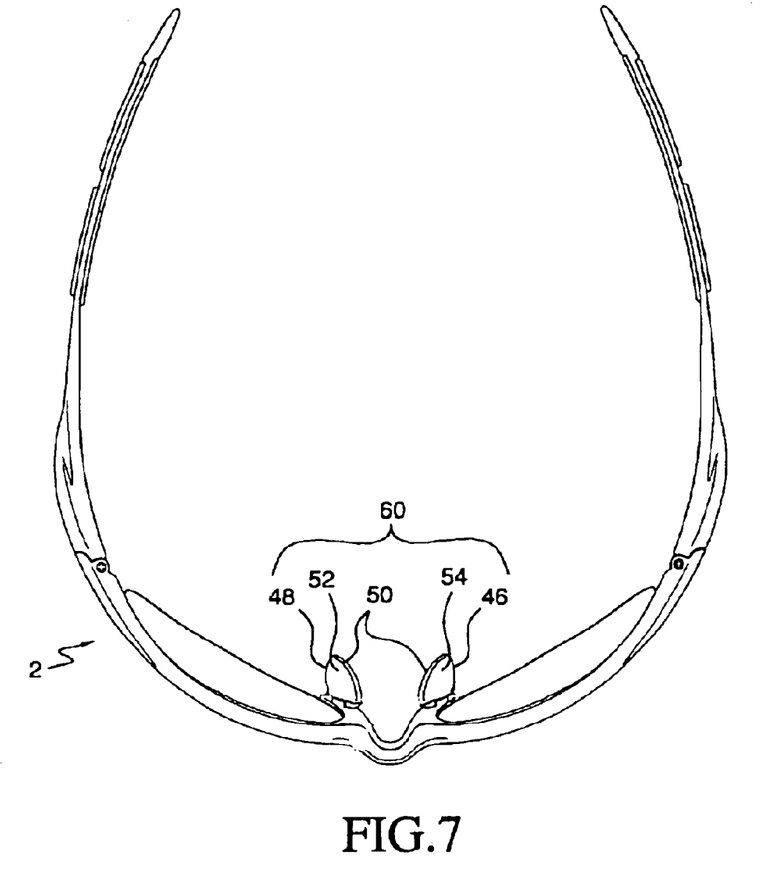
FIG. 7 illustrates a top-down view of goggles 2 depicted in FIG. 1.
Figure 8:
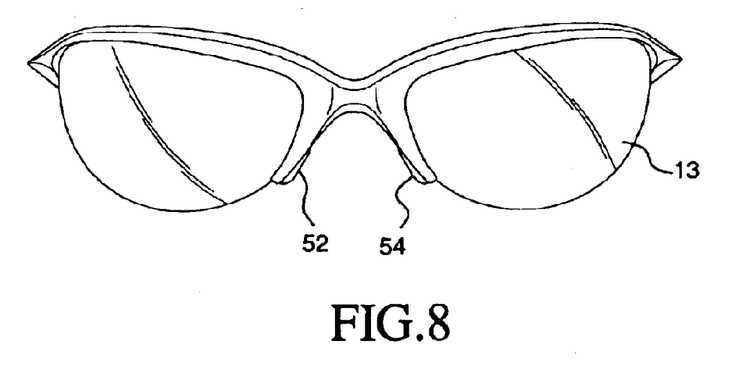
FIG. 8 presents a front view of goggles 2 depicted in FIG. 7.

FIG. 7 illustrates a top-down view of goggles 2 depicted in FIG. 1, without shield 4, while FIG. 8 presents a front view of goggles 2 depicted in FIG. 7. As seen in FIG. 8, nosepad covers 52 and 54 extend slightly closer to the wearer's nose (not shown) than the surfaces from which they depend. In this embodiment, nosepad covers 52 and 54 are the only portion of goggles 2 that contact the wearer's nose. As illustrated, nosepad covers 52 and 54 may cover more than fifty percent of the nosepads. Preferably, the nosepad covers 52 and 54 may cover substantially all of nosepads 50.

Figure 9:
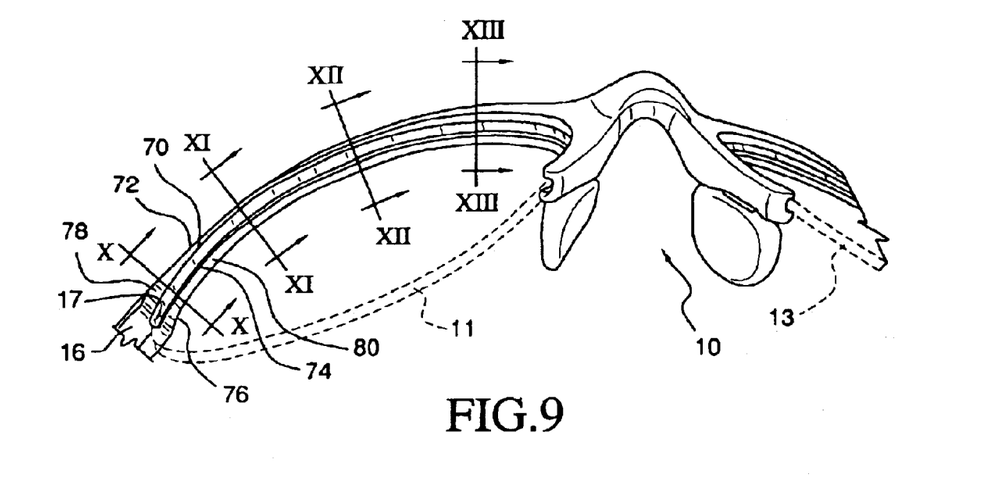
FIG. 9 shows a partial view of frame front 10, with lenses 11 and 13 depicted in phantom outline.

FIG. 9 shows a partial view of frame front 10, with lenses 11 and 13 depicted in phantom outline. In an embodiment, groove 17 is formed on the lens-facing surface of left orbital 16 and comprises a trench defined by front edge 70 and rear edge 74. In this embodiment, the material of left orbital 16 that lies forward of groove 17 defines front ridge 78, while the material of left orbital 16 that lies rearward of groove 17 defines rear ridge 80. The front edge 70 of groove 17 defines the rear edge of front ridge 78, while the rear edge 74 of groove 17 defines the front edge of rear ridge 80.

The distance from front edge 70 of groove 17 to front surface 72 of orbital 16 may vary in a tapered fashion. In other words, front ridge 78 may vary in thickness from front to back along its run from left to right in left orbital 16. At the same time, rear edge 74 of groove 17 may maintain a constant distance from the rear surface 76 of left orbital 16. In other words, rear ridge 80 may be uniform in thickness from front to back along its run from left to right in left orbital 16. Similar relationships may exist between right lens 13 and right orbital 18.

Groove 17 is dimensioned and shaped to cooperatively receive left lens 11. Groove 17 may be of constant width measured from front edge 70 to rear edge 74. For example, the width of groove 17 may be about 2.3 millimeters. For left lens 11 that is also about 2.3 millimeters in thickness, such a groove would hold left lens 11 tightly between front ridge 78 and rear ridge 80. This may be a press-fit with no adhesion, which would permit left lens 11 to be repeatedly removed and re-inserted in goggles 2 by a wearer. Alternatively, left lens 11 may be adhered in groove 17, or permanently affixed to frame front 10, to provide goggles having permanently attached lenses.

Left orbital 16 and right orbital 18 may be made of a strong cast metal such as, for example, titanium, titanium alloy or similar material. Preferably, the strength of the cast metal is that of titanium or greater. The strength of the material dictates a minimum average width of front ridge 78 and rear ridge 80 to achieve dimensional stability in the absence of left lens 11 or right lens 13. For example, this minimum average width for titanium is about 1 millimeter over a run of at least one half inch. However, with lens 11 tightly in place between front ridge 78 and rear ridge 80, the dimensional stability of front ridge 78 is supplemented by the dimensional stability of lens 11 and rear ridge 80, particularly where rear ridge 80 has an average depth substantially in excess of the minimum average width.

In one embodiment, the sum of the average widths of the front ridge 78 and the rear ridge 80 along a given run of at least one-half inch totals at least about twice the minimum average width. At the same time, the average width of one of those two ridges along that run is substantially less than the minimum average width, with the deficiency in dimensional stability made up by the thickness of the other one of the two ridges exceeding the minimum average width.

If frame front 10 is made of a material having a certain minimum average width of a lone ridge to achieve dimensional stability of goggles 2 without lenses 11 and 13, and rear ridge 80 has an average width greater than that minimum average width, front ridge 78 can be made narrower than the minimum average width. For example, if left orbital 16 and right orbital 18 are made of a material having a minimum average width of one millimeter over a run of one-half inch, and rear ridge 80 has an average width of two millimeters, the front ridge 78 can have an average width much smaller than one millimeter, such as about 0.3 millimeters over a run of at least one-half inch.

In an embodiment constructed of titanium or titanium alloy, the thickness of rear ridge 80 is maintained at or above two millimeters whereas the thickness of front ridge 78 may taper gradually from about 2.0 millimeters at the left end of left orbital 16, down to about 0.3 millimeters or less in an intermediate portion of left orbital 16, and back up to about 2.0 millimeters at the right end of left orbital 16. The intermediate portion is between the left end and the right end and averages about 0.3 millimeters over a run of about one-half inch. Preferably, the intermediate portion averages less than about 0.6 millimeters over a run of about one inch. Similar dimensional relationships may be applied to right orbital 18.

Frame front 10 may be cast in one piece as a rigid member, preferably containing titanium. In one embodiment, left nosepad 48 and right nosepad 46 are cast in one piece with frame front 10, while in another embodiment, left nosepad 48 and right nosepad 46 may be cast separately and fixedly attached to frame front 10.

Figure 10:
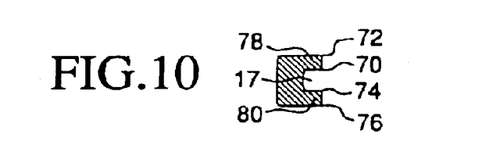
FIG. 10 presents a cross-section of left orbital 16 taken along lines X—X of FIG. 9, at the left end of left orbital 16.

FIG. 10 presents a cross-section of left orbital 16 taken along lines X—X of FIG. 9, at the left end of left orbital 16. As shown therein, front ridge 78 has a width of about 2.0 millimeters at the left end of left orbital 16.

Figure 11:
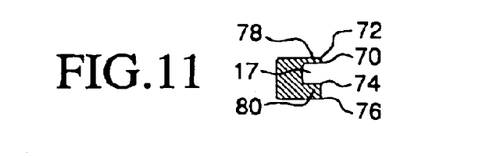
FIG. 11 illustrates a cross-section taken along lines XI—XI of FIG. 9, in an intermediate section of left orbital 16.

FIG. 11 illustrates a cross-section taken along lines XI—XI of FIG. 9, in an intermediate section of left orbital 16. As shown therein, front ridge 78 has a width of about 0.3 millimeters at this intermediate point of left orbital 16.

Figure 12:
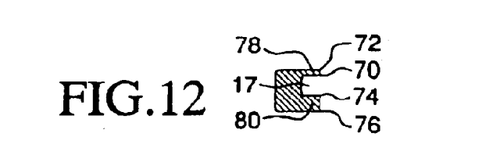
FIG. 12 shows a cross-section taken along lines XII—XII of FIG. 9, in an intermediate section of left orbital 16.

FIG. 12 shows a cross-section taken along lines XII—XII of FIG. 9, in an intermediate section of left orbital 16. As shown therein, front ridge 78 has a width of about 0.6 millimeters at this intermediate point of left orbital 16. The run between the intermediate point in FIG. 11 and the intermediate point in FIG. 12 is at least about one inch. In that run, the average width of front ridge 78 is less than about 0.6 millimeters. In an embodiment, for at least one-half inch of that run, the width of front ridge 78 never exceeds about 0.3 millimeters.

Figure 13:
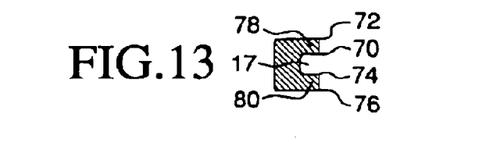
FIG. 13 depicts a cross-section of left orbital 16 taken along lines XIII—XIII of FIG. 9, at the right end of left orbital 16.

FIG. 13 depicts a cross-section of left orbital 16 taken along lines XIII—XIII of FIG. 9, at the right end of left orbital 16. As shown therein, front ridge 78 has a width of about 2.0 millimeters at the right end of left orbital 16.

In each of FIGS. 10–13, the width of groove 17 may be constant. As illustrated, a preferred width is about 2.3 millimeters. Further, as illustrated, the curvature of left lens 11 and right lens 13 may be too high, i.e., e.g., about eight, to accept a prescription. Lenses of such high curvature are referred to as "wrap-around" because they wrap partially around the side of a wearer's face. In an embodiment, left lens 11 and right lens 13 are non-prescription wrap-around lenses of constant thickness, removeably held in a groove of constant width.

The width of rear ridge 80 is also shown constant in FIGS. 10–13, at about 2.0 millimeters. However, this width need not be constant along its run from left to right in left orbital 16.

Figures 14A, 14B, 15:
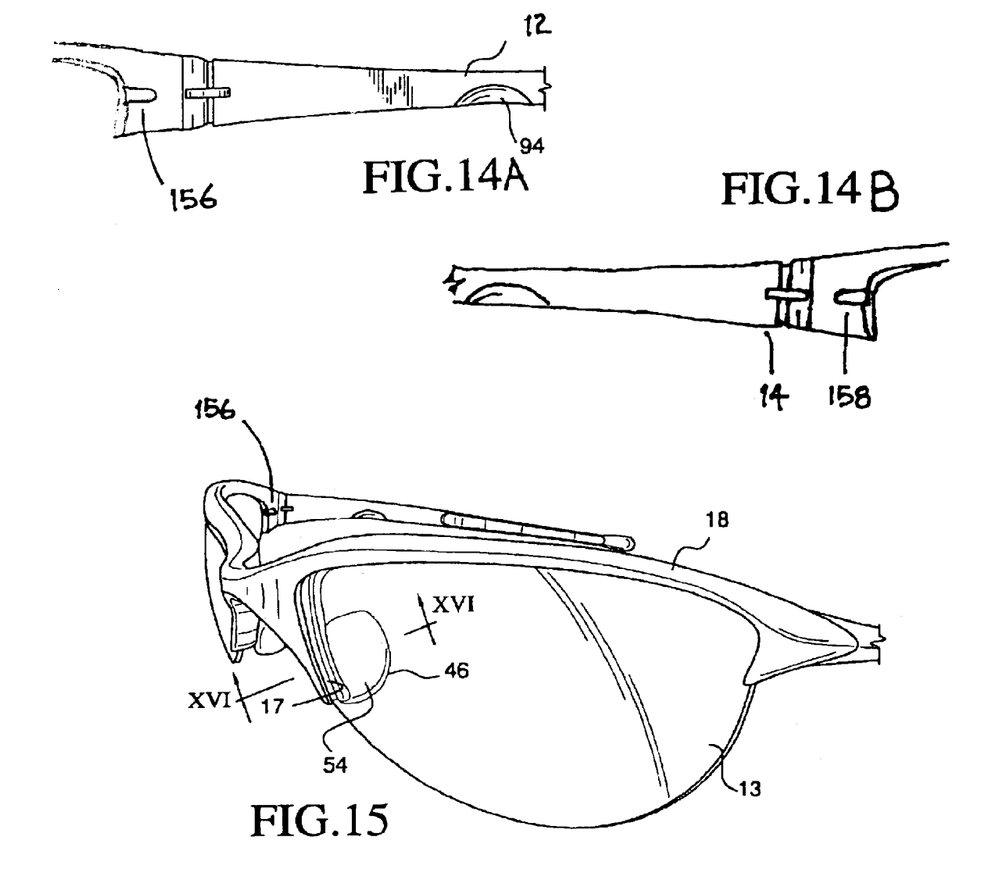
FIG. 14A illustrates part of left temple 12 and left orbital 16 as seen from the right side.
FIG. 14B illustrates part of right temple 14 and right orbital 18 as seen from the left side.
FIG. 15 is a view of right orbital 18, left temple 12 and a portion of left orbital 16 as seen from the right side of goggles 2 illustrated in FIG. 7.

FIG. 14A illustrates part of left temple 12 and left orbital 16 as seen from the right side, while FIG. 14B illustrates part of right temple 14 and right orbital 18 as seen from the left side. As seen in FIG. 14A, left orbital 16 includes indent 156 and thumb depression 94. In like fashion, right orbital 18 includes indent 158 and thumb depression 96, as seen in FIG. 14B.

In an embodiment, thumb depressions 94 and 96 are concave depressions removed from the inside lower corner of left temple 12 and right temple 14, respectively. Thumb depressions 94 and 96 are shaped and dimensioned to provide a firm gripping place for a wearer's thumb. The gripping action may be enhanced by providing a substantially parallel angled surface on the opposite side of left temple 12 and right temple 14. For example, when thumb depression 94 is formed on the inside lower corner of left temple 12, as shown in FIG. 14A, the substantially parallel angled surface may be formed on the outside upper corner of left temple 12. A wearer can hold goggles 2 with opposing force between a thumb placed in thumb depression 94 and a forefinger of the same hand placed on the substantially parallel angled surface. This type of grip is much less likely to damage goggles 2 than a grip that involves the wearer touching left lens 11 below frame front 10. It is especially beneficial when left lens 11 is held in frame front 10 removably and/or by a narrow front ridge 78. Thus, the easy grip provided for the temples permits the front ridge 78 to have an average width less than the average minimum width discussed above while still achieving dimensional stability and durability of the goggles.

Thumb depressions 94 and 96 may enhance the ability of a user to grip goggles 2. This is especially important because goggles 2 includes a half-jacket frame front 10, which may not be grabbed by a wearer as easily as a full-jacket front frame. Thumb depressions 94 and 96 may protect the dimensional stability of frame front 10 by encouraging wearers to grip the temples and not the frame front while putting on, removing, handling, or adjusting goggles 2. Gripping the frame front of half-jacket goggles can lead to damage of the goggles because the wearer may apply force directly to a lens or thin ridge. Such force may, for example, accidentally remove a lens from the frame front.

Thumb depressions 94 and 96 may reduce the weight of left and right temples 12 and 14, respectively, while still maintaining strength and stability of left and right temples 12 and 14. Thumb depression 94 may not be readily noticeable when a wearer is wearing goggles 2 and therefore may not affect the overall appearance of the goggles when worn.

Figure 16:
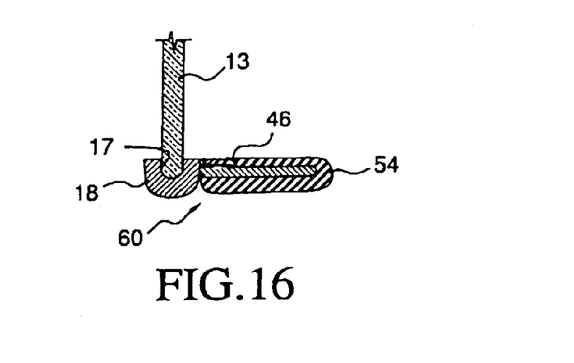
FIG. 16 is a cross section taken through lines XVI—XVI in FIG. 15.

As shown in FIGS. 6 and 7, left and right nosepads 48 and 46 extend a distance rearwardly away from left and right orbitals 16 and 18, respectively. This rearward direction appears in FIGS. 6 and 7 as extending from the each orbital toward the top of the page. The rearward direction is also shown in FIG. 16 as extending from left to right on the page. At the same time, each nosepad also extends a distance along its orbital, generally parallel to the orbital at the point of attachment. This orbital distance appears in FIG. 15 as a diagonally upward and leftward direction, extending from the bottom of nosepad 46 diagonally upward and leftward on the page. As illustrated in FIGS. 6, 7, and 15, each nosepad extends in the rearward direction nearly as far as in the orbital direction. Thus, the nosepad extends in the rearward direction a distance at least as great as approximately the distance the nosepad extends in the orbital direction.

FIG. 15 is a view of right orbital 18, left temple 12 and a portion of left orbital 16 as seen from the right side of goggles 2 illustrated in FIG. 7. Left indent 156 can be seen on the posterior side of left orbital 16.

The inventors have determined that consumer acceptance of convertible goggles may be limited if the goggles contain a shield retainer device that is obviously visible when the shield is not attached. Convertible goggles may be more aesthetically pleasing and commercially acceptable if the goggles' shield retainer device is substantially hidden when the goggles are used without a shield. This is particularly hard to achieve in a half-jacket design because there is no lower frame piece to help carry and/or shield from view a shield retainer. In an embodiment, left indent 156, as well as right indent 158 (not visible in FIG. 15), may not be visible when goggles 2 are worn on the wearer's head. When shield 4 is in place, of course, shield 4 covers left and right indents 156 and 158, thereby making left and right indents 156 and 158 invisible, as in FIG. 1.

Regardless of whether goggles 2 are being worn, left and right indents 156 and 158 may be hidden from view when shield 4 is removed from goggles 2. Left and right indents 156 and 158 may be invisible from the front of goggles 2, as in FIG. 8. Left and right indents 156 and 158 may also be invisible from the bottom of goggles 2, as shown in FIG. 6. Thus, eyewear 1 can provide goggles 2 that can be used without shield 4 and yet contain left and right indents 156 and 158 hidden from view. This may be desirable in order to enhance consumer acceptance of half-jacket goggles 2 for use without shield 4, while still providing the option of using shield 4.

Also seen in FIG. 15 is the seating of right lens 13 in groove 17.

Freedom of stylistic design is enhanced with a front ridge 78 that has an average width less than the minimum average width for a lone ridge, while durability and weight reduction are enhanced by the provision of thumb depressions 94 and 96 for gripping goggles 2 without touching half-jacket frame front 10. Aesthetic appeal and commercial acceptance may be enhanced by providing half-jacket goggles whose shield retaining device, e.g., indents 156 and 158, and eyewear gripping means, e.g., thumb depressions 94 and 96, are substantially invisible when the goggles are worn.

FIG. 16 is a cross section taken through lines XVI—XVI in FIG. 15. This cross section depicts right nosepad 46 covered by nosepad cover 54. Right nosepad 46 and right orbital 18 may be molded together in one piece. Alternatively, right nosepad 46 may be attached to right orbital 18, by welding for example.

Figure 17:
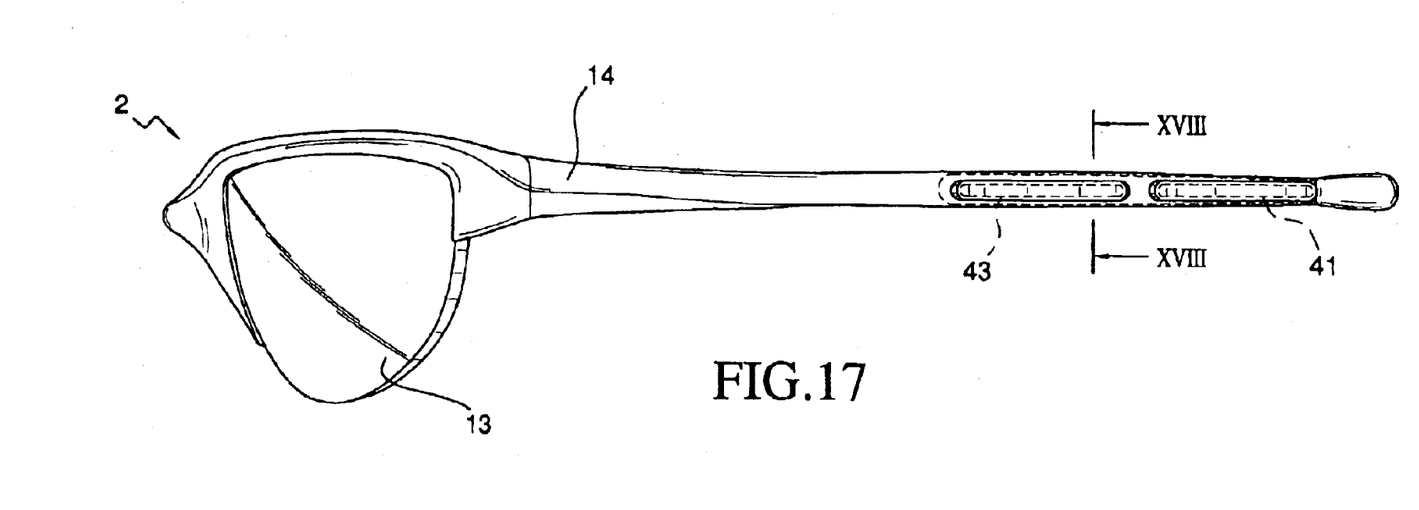
FIG. 17 presents goggles 2 from the right side.

FIG. 17 presents goggles 2 from the right side. Due to the reflectivity of right lens 13, nose contacting element 60 is not shown in this side view.

Figure 18:
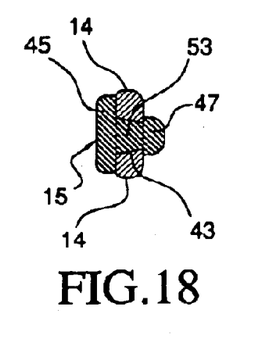
FIG. 18 illustrates a cross-section taken at lines XVIII—XVIII of FIG. 17.

FIG. 18 illustrates a cross-section taken at lines XVIII—XVIII of FIG. 17. Slip resistor 15 is shown inserted into right temple 14. Pad 47 of slip resistor 15 is connected to backing 45 by extension 53. Pad 47 may have rounded surfaces facing away from right temple 14. Right temple 14 is formed with hole 43, which is taped from a larger radius to a smaller radius from right to left. The rounded surfaces and tapered hole may facilitate a force-fit through hole 43 in right temple 14.

In an embodiment, slip resistor 15 is installed in right temple 14 by pressing the rounded edges into tapered hole 43 from the right side of right temple 14, i.e., the side that would face a wearer of eyewear 1. Pad 47 is deformed as it meets the tapered edges of hole 43, and, upon the application of further force, pad 47 is deformed sufficiently so that its outer diameter may be equal to the smallest radius of tapered hole 43. At this point, pad 47 may pass through hole 43 from right to left, and tapered extension 53 may then mate with tapered hole 43. Backing 45 may rest snugly against the right side of right temple 14. Slip resistor 15 may be removed by a similar process performed in reverse. The removability of slip resistor 15 permits replacement of a damaged slip resistor. It also permits eyewear 1 to be worn without slip resistors.

When slip resistor 15 is installed and goggles 2 are worn, backing 45 may bear against skin of the wearer's head, and pad 47 may bear against the wearer's ear or helmet, for example.

Preferably, left lens 11 and right lens 13 are removable from goggles 2. The removability of lenses 11 and 13 permits them to be replaced with different types of lenses for different conditions. For example, when a wearer desires to drive a motorcycle at night and receive the protection of shield 4 without the tint of left lens 11 and right lens 13, the wearer can remove left lens 11 and right lens 13 and insert replacement lenses that do not have a tint. Eyewear 1 can be sold with or accommodate use of an array of different colored lenses for fashion or function.

The removability of left lens 11 and right lens 13 also permits replacement of damaged lenses. Half-jacket goggles may be more prone to lens damage than full-jacket goggles because the bottom edges of the lenses are exposed. Thus, the half-jacket goggles are preferably provided with removable and replaceable lenses. In addition, lenses in eyewear worn by a participant in high speed sports may be more prone to damage. For example, if goggles fell off the face of a motorcycle rider traveling at high speed, lenses in the goggles may be subject to damage when the goggles hit the ground. Providing replaceable lenses may reduce the cost and effort required to repair damaged goggles worn by a participant in high speed sports.

Although eyewear 1 is shown with an upper half-jacket frame (having no orbital underneath of the lenses), other embodiments are contemplated. For example, the removable shield or the nosepad/retainer arrangement can be employed in a lower half-jacket or a full jacket frame.

Figure 19:
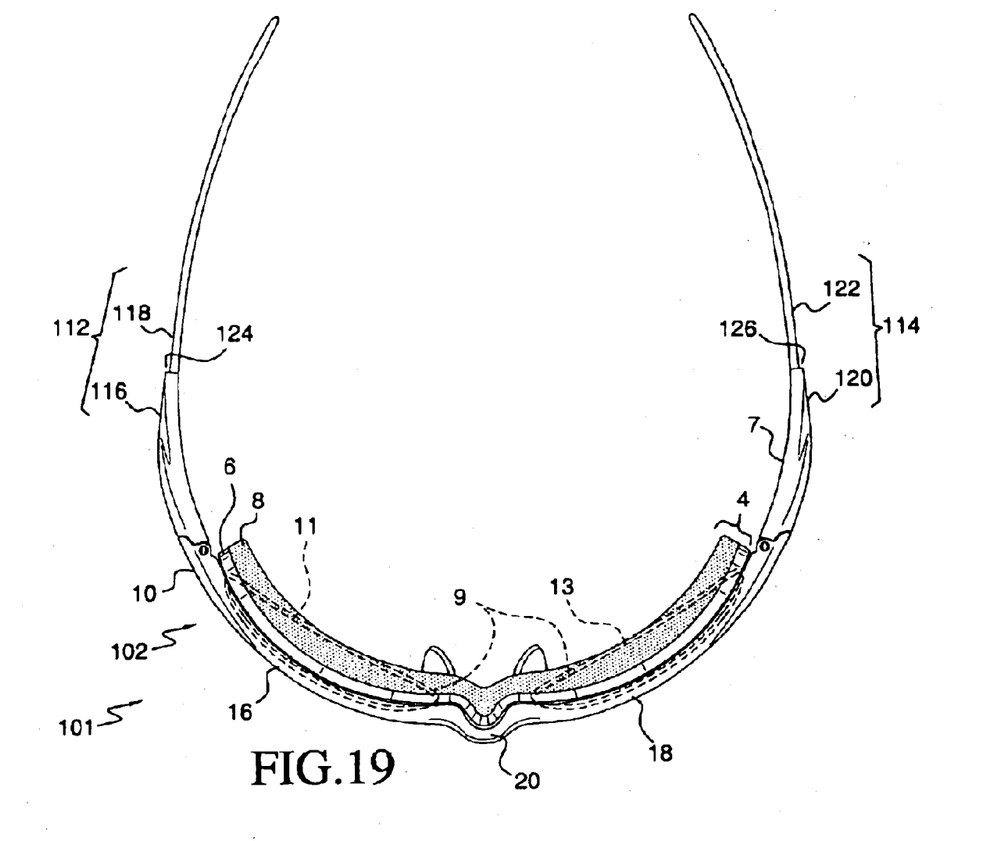
FIG. 19 depicts another embodiment, in which eyewear 101 includes goggles 102 and shield 4.

FIG. 19 depicts another embodiment, in which eyewear 101 includes goggles 102 and shield 4. Goggles 102 include left temple 112 and right temple 114. Left temple 112 has a full portion 116 and a narrow portion 118, while right temple 114 has a full portion 120 and a narrow portion 122. The narrow portions transition to the full portions in step-downs 124 and 126.

Figure 20:
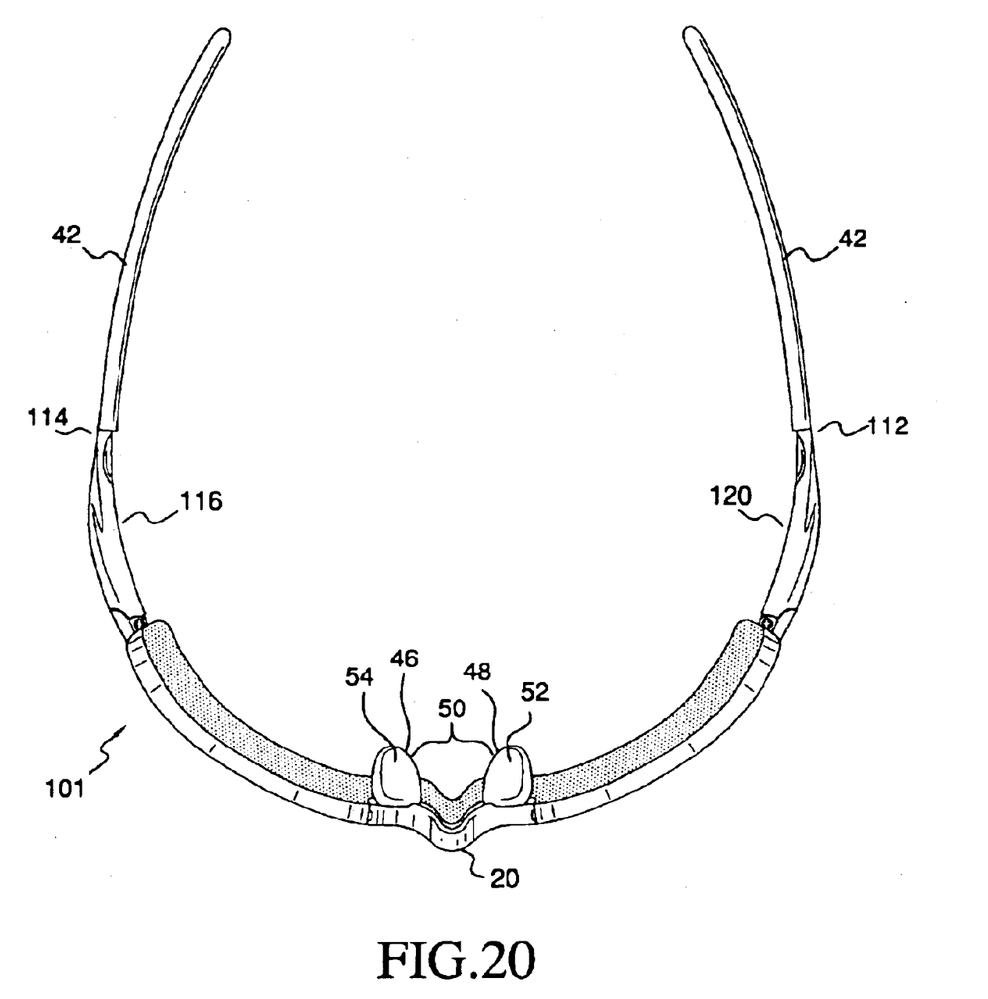
FIG. 20 illustrates a bottom-up view of the eyewear shown in FIG. 19, with the addition of a pair of identical elastomeric slip resistors 42.

FIG. 20 illustrates a bottom-up view of the eyewear shown in FIG. 19, with the addition of a pair of identical elastomeric slip resistors 42. Slip resistors 42 are sleeves that surround narrow portions 118 and 122. The front ends of slip resistors 42 abut step-downs 124 and 126. The radial thickness of slip resistors 42 is approximately equal to step downs 124 and 126 dimensioned such that a smooth transition may be effected between slip resistors 42 and full portions 116 and 120.

Figure 21:
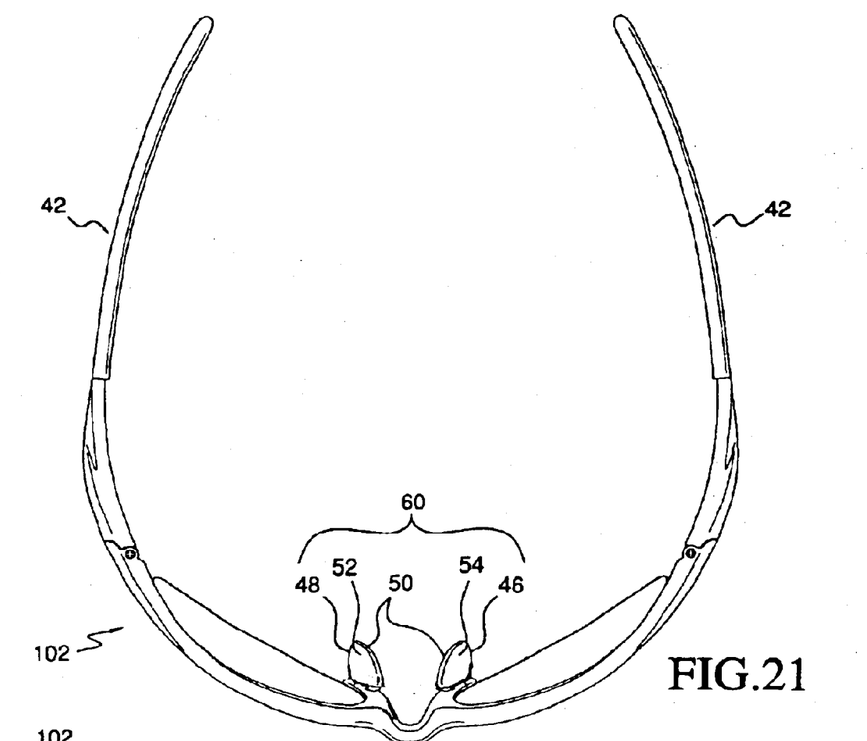
FIG. 21 shows a top-down view of goggles 102 with slip resistors 42.
Figure 22:
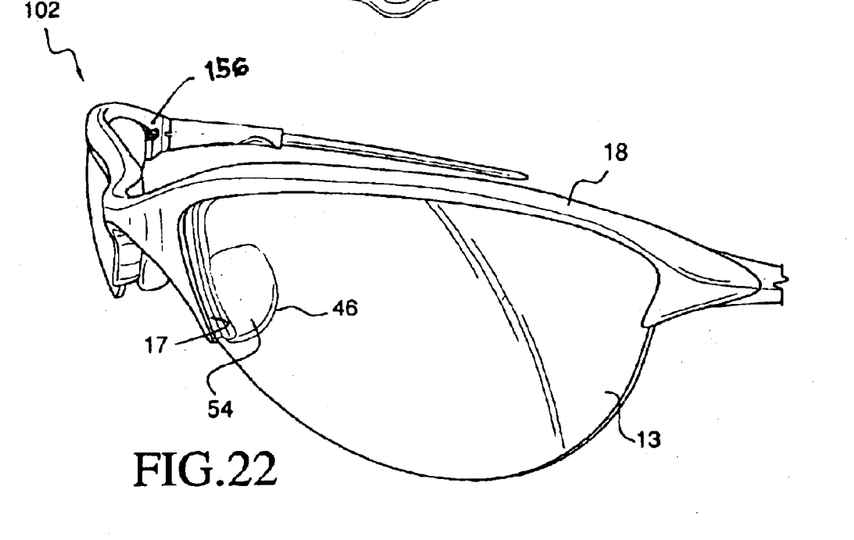
FIG. 22 depicts a partial side view of goggles 102 after removal of slip resistors 42.

FIG. 21 shows a top-down view of goggles 102 with slip resistors 42, while FIG. 22 depicts a partial side view of goggles 102 after removal of slip resistors 42.

Slip resistors 42 may be affixed to the temples with a suitable adhesive, or may simply be positioned over the temples and removably retained thereon by friction. Temples 112 and 114 may be notched or knurled to increase friction. When adhesive is used, the adhesive is preferably water-resistant. Slip resistors 42 may be closed over the back ends of temples 112 and 114 in a cupping arrangement.

While this invention has been described in conjunction with specific embodiments thereof, many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

What is claimed is:

1. Eyewear, comprising:
   a half-jacket frame, including:
      a left indent,
      a left upper lens groove adapted to receive a left lens,
      a right indent, and
      a right upper lens groove adapted to receive a right lens; and
   a removable shield, extending from the half-jacket frame to a wearer's face to prevent direct impingement of air and dust on the wearer's eyes, the removable shield including:
      a left lens opening,
      a left detent to engage the left indent,
      a left lower lens groove, adapted to receive the left lens and mate circumferentially with the half-jacket frame,
      a right lens opening,
      a right detent to engage the right indent, and
      a right lower lens groove, adapted to receive the right lens and mate circumferentially with the half-jacket frame.

2. The eyewear of claim 1, wherein the left and right lenses are removable.

3. The eyewear of claim 1, wherein the half-jacket frame is rigid and cast in one piece from a metal including titanium.

4. The eyewear of claim 1, wherein the removable shield includes a rigid plastic segment and a pad.

5. The eyewear of claim 4, wherein the pad is air-permeable foam.

6. The eyewear of claim 5, wherein the pad has a thickness 't', wherein 't' is about 0.25 inches.

7. The eyewear of claim 1, wherein the half-jacket frame includes substantially rigid left and right temples.

8. The eyewear of claim 7, wherein the half-jacket frame includes slip resistors carried by the left and right temples.

9. The eyewear of claim 8, wherein the slip resistors are permanently affixed to the left and right temples with an adhesive.

10. The eyewear of claim 7, wherein at least one of the left and right temples includes a temple gripping means for a wearer to grip the temple, the temple gripping means being substantially hidden when the goggles are worn, the temple gripping means including a thumb-shaped indentation formed in the temple.

11. The eyewear of claim 7, wherein the left and right temples each include an elongated member having a one-piece elastomeric slip resistor.

12. The eyewear of claim 11, wherein:
   the elongated member includes a plurality of holes formed therein; and
   the one-piece elastomeric slip resistor includes:
      an elongated backing,
      a plurality of transverse extensions extending transversely from the elongated backing, and
      a pad mounted on each of said plurality of transverse extensions.

13. The eyewear of claim 12, wherein the elastomeric slip resistor is removably seated in the plurality of holes.

14. The eyewear of claim 1, wherein the half-jacket frame and the removable shield are configured to form together a complete orbital surrounding the left lens and a complete orbital surrounding the right lens.

15. The eyewear of claim 14, wherein the left upper lens groove mates coterminously with the left lower lens groove and the right upper lens groove mates coterminously with the right lower lens groove.

16. The eyewear of claim 15, wherein:
   the left upper lens groove includes at least one lens-retaining ridge having at least one long run about one inch in length with a cross-sectional dimension averaging less than about 0.6 millimeters; and
   the right upper lens groove includes at least one lens-retaining ridge having at least one long run about one inch in length with a cross-sectional dimension averaging less than about 0.6 millimeters.

17. The eyewear of claim 16, wherein the lens-retaining ridges each have at least one short run about one-half inch in length with a cross-sectional dimension averaging no more than about 0.3 millimeters.

18. Eyewear, comprising:
a half-jacket frame, including:
   a left upper lens groove adapted to receive a left lens, and
   a right upper lens groove adapted to receive a right lens; and
a removable shield, extending from the half-jacket frame to a wearer's face to prevent direct impingement of air and dust on the wearer's eyes, the removable shield including:
   a left lens opening,
   a left lower lens groove, adapted to receive the left lens and mate circumferentially with the half-jacket frame,
   a right lens opening, and
   a right lower lens groove, adapted to receive the right lens and mate circumferentially with the half-jacket frame.

19. The eyewear of claim 18, wherein the left and right lenses are removable.

20. The eyewear of claim 18, wherein the removable shield includes a rigid plastic segment and an air-permeable foam segment.

21. The eyewear of claim 18, wherein the half-jacket frame includes:
   substantially rigid left and right temples; and
   slip resistors carried by the left and right temples.

22. The eyewear of claim 18, wherein the half-jacket frame and the removable shield are configured to form together a complete orbital surrounding the left lens and a complete orbital surrounding the right lens.

23. Eyewear, comprising:
a rigid half-jacket frame, including:
   a left indent,
   a left upper lens groove adapted to receive a removable left lens,
   a left temple having a slip resistor,
   a right indent,
   a right upper lens groove adapted to receive a removable right lens, and
   a right temple having a slip resistor; and
a removable shield, extending from the half-jacket frame to a wearer's face to prevent direct impingement of air and dust on the wearer's eyes, the removable shield including:
   a left lens opening,
   a left detent to engage the left indent,
   a left lower lens groove, adapted to receive the left lens and mate coterminously with the left upper lens groove,
   a right lens opening,
   a right detent to engage the right indent,
   a right lower lens groove, adapted to receive the right lens and mate coterminously with the right upper lens groove,
   a rigid plastic segment, and
   an air-permeable foam segment.

* * * * *